Aug. 9, 1966     B. P. BLASINGAME     3,265,960
CAPACITIVE RESOLVER

Original Filed Nov. 8, 1959     2 Sheets-Sheet 1

INVENTOR.
Benjamin P. Blasingame
BY
Hugh L. Fisher
ATTORNEY

Aug. 9, 1966 B. P. BLASINGAME 3,265,960
CAPACITIVE RESOLVER

Original Filed Oct. 8, 1959 2 Sheets-Sheet 2

$e_1 = e \sin \omega t$ $e_2 = e \sin(\omega t - \frac{\pi}{2})$

INVENTOR.
Benjamin P. Blasingame
BY
Hugh L. Fisher
ATTORNEY

United States Patent Office 3,265,960
Patented August 9, 1966

3,265,960
CAPACITIVE RESOLVER
Benjamin P. Blasingame, 2621 E. Menlo Blvd.
Milwaukee, Wis.
Original application Oct. 8, 1959, Ser. No. 845,242, now Patent No. 3,172,023, dated Mar. 2, 1965. Divided and this application Oct. 16, 1964, Ser. No. 404,379
4 Claims. (Cl. 323—128)

This is a division of my copending application Serial No. 845,242, filed October 8, 1959, now Patent No. 3,172,023.

This invention relates to resolvers and, more particularly, to a capacitive resolver for providing electrical signals which are related in phase to the relative angular disposition of two members.

Present day resolvers are electromechanical devices which provide an alternating current signal voltage whose phase differs from that of a reference voltage by an amount precisely equal to the shaft rotation of the resolver. This action is accomplished by means of a four pole stator containing two field windings excited by voltages which are precisely 90° out of electrical phase with respect to each other inside of which a two pole armature containing a single winding is rotated by the resolver shaft. This field arrangement is essentially analogous to that of a two phase induction motor wherein field windings are excited 90° out of electrical phase to produce a rotating magnetic field. The single armature winding of the resolver acts like the secondary of a transformer having induced in it the sum of voltages from both field windings. The voltage induced by each field winding is proportional to the sine of the angle between the axis of the armature and the axis of the field pole. Thus the armature voltage is given by the mathematical expression:

$$e_{out} = n_1 e_1 \sin \omega t \sin \alpha + n_2 e_2 \sin\left(\omega t - \frac{\pi}{2}\right) \sin\left(\alpha - \frac{\pi}{2}\right)$$

where:

$e_{out}$ = armature voltage magnitude
$n_1$ = turns ratio of armature to pole number 1
$e_1$ = voltage magnitude impressed on field number 1
$\omega$ = frequency of excitation voltage in radians/sec
$t$ = time in seconds
$\alpha$ = angle between axis of armature winding and field pole number 1
$n_2$ = turns ratio of armature to pole number 2
$e_2$ = voltage magnitude impressed on field number 2

Since the armature is rigidly fastened to the resolver shaft, $\alpha$ is also the angle of the resolver shaft with respect to the reference position.

This may be rewritten:

$$e_{out} = n_1 e_1 \sin \omega t \sin \alpha - n_2 e_2 \cos \omega t \cos \alpha \quad (1)$$

If now $n_1$ is made equal to $n_2$ by manufacture and $e_1$ is made equal to $e_2$ by the excitation provisions, then applying the formula $$\cos(x+y) = \cos x \cos y - \sin x \sin y$$

This may be rewritten:

$$e_{out} = n e_{in} \cos(\omega t + \alpha) \quad (2)$$

It is now seen that the output voltage is shifted in electrical phase by exactly the shaft angle, $\alpha$.

A device of this type has many uses in analogue computations, data transmission and general instrumentation applications. The phase shift angle and hence shaft angle may be digitalized by suitable pulse counting systems. Where a shaft position must be measured to extreme precision, gearing is sometimes introduced between the shaft and the resolver. By gearing up the resolver, the phase angle can thus be made to rotate through 360 electrical degrees for some fraction of a complete rotation of the shaft. This introduces an ambiguity in the actual shaft position which must be accounted for by some means such as another "single speed" resolver. Such applications are common in the present instrumentation art.

Two problems in the use of resolvers are the inaccuracy, backlash and expense introduced by gearing resolvers for high accuracy and the electrical and mechanical problems attending the use of slip rings and brushes to connect the armature windings to the resolver terminals. The former problem limits the accuracy of such systems to the accuracy of gear trains and the latter limits the applications to environments which are relatively free of vibration, corrosion, etc.

According to the present invention, a resolver is provided which will produce an output voltage, the electrical phase angle of which is related to the position of a rotatable member by some integral multiple without the use of auxiliary gearing and its attendant inaccurary, cost and inconvenience. In general, this is accomplished by means of a capacitive resolver including a stator member and a rotor member, one of which members includes at least four capacitive elements which are symmetrically disposed about an axis, and the other of which members includes a single element which is rotatable over the other elements. The single element is axially spaced from the four elements and is capacitively associated therewith. To provide the signals in accordance with the invention, a first time varying voltage is impressed across one diagonally opposite pair of the four elements, and a second time varying voltage which is in quadrature with the first voltage is impressed across the other diagonally opposite pair of elements. The single element is of such a configuration as to face or be capacitively associated with a single one of the four elements when the stator and rotor members are in a reference position and to overlap two of the four elements when the stator and rotor members are relatively rotated from the reference position. According to this scheme, a voltage is impressed upon the single element which has a phase angle with respect to the first voltage related to the angle of displacement of the rotor and stator members.

In accordance with a preferred form of this invention, the design of the individual capacitor elements or plates is such that the set of four or $4n$ plates may be disposed in a single plane on the stator member thereby permitting a single plane rotor plate so that the inventive resolver is especially compact and of simple mechanical design. According to a particular embodiment of the invention, a set of four or $4n$ conductive plates may be coplanarly disposed in circular symmetry on the stator member and a single conductive plate which is axially spaced from the stator plates may be provided on the rotor member. The rotor and stator plates may be shaped to correspond to certain specified mathematical curves thereby to provide a capacity between the stator and rotor which is proportional to the sine of the angle of displacement between the rotor and stator members as measured from a reference position.

In addition, according to a further embodiment of the invention, the design of the rotor and stator plates may be made in a multi-leafed pattern according to a certain mathematical formula to provide any desired multiple speed effect. Accordingly, extremely high accuracy and sensitivity may be achieved from the invention without the use of step-up gearing.

Other objects and structural details of this invention will be apparent from the following description when read in connection with the accompanying figures wherein.

Figure 1A:
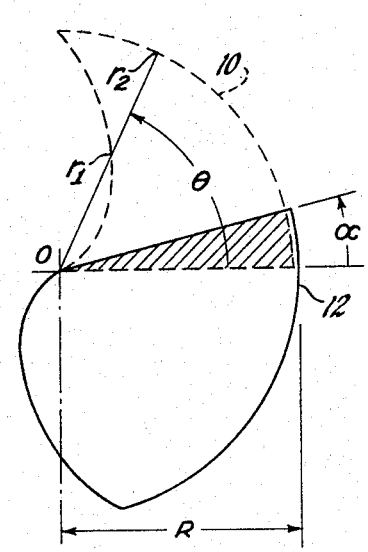
FIGURE 1a and 1b are illustrative of the design of the rotor and stator plates in accordance with a specific embodiment of the invention and are used in establishing the methematical nomenclature in the specification following.

Referring first to FIGURE 1a, it is seen that a single stator plate 10 is shown by a dotted outline while an associated rotor plate 12 shown by a solid line has been turned from the reference position through the angle $\alpha$ so the area marked by cross hatching is common to both the stator and the rotor. This area of overlap forms a capacitor. It is to be noticed that only a single stator plate is shown; in the complete resolver instrument, a minimum of four such plates are necessary. The periphery of both the stator and the rotor plates are circles of radius R and center at the center of rotation marked by the cross mark and O. This point is taken as the origin of the polar coordinate system used to describe mathematically the shaping of the rotor and stator plates and for analyzing the operation of the combination. The curves describing the outline of the stator plate are:

$$r_2 = R$$

$$r_1 = \sqrt{2} R \sin \frac{\theta}{2}$$

Where the letters indicate the radial distance to the outlines from the origin along a radial line making an angle $\theta$ with the horizontal line designated as the reference line. The third side of the stator plate 10 is a straight radial line described by the simple equation:

$$\theta = 0$$

The rotor plate 12 is outlined by a radial line, a circle of radius R and a curve identical to that of the stator such that when the rotor has turned through the angle, $\alpha = 180°$, the area of overlap between the rotor and stator is exactly zero.

The area of overlap between the rotor and the stator and hence the capacity is shown to be proportional to the sine of the shaft angle, $\alpha$. Consider first this area for values of $\alpha$ between zero and ninety degrees. FIGURE 1a illustrates this region particularly well. The area of a curve in polar coordinates is given by the integral:

$$\text{Area} = \frac{1}{2} \int_{\theta_1}^{\theta_2} r^2 d\theta$$

The area of overlap is then:

$$A = \frac{1}{2} \int_0^\alpha r_2^2 d\theta - \frac{1}{2} \int_0^\alpha r_1^2 d\theta$$

$$2A = \int_0^\alpha R^2 d\theta - \int_0^\alpha \left(\sqrt{2}R \sin \frac{\theta}{2}\right)^2 d\theta$$

let $$x = \frac{\theta}{2}; \quad dx = \frac{1}{2} d\theta; \quad d\theta = 2dx$$

$$\frac{2A}{R^2} = \int_0^\alpha d\theta - 4 \int_0^{\frac{1}{2}\alpha} \sin^2 x \, dx$$

from integral tables:

$$\int \sin^2 x \, dx = \frac{1}{2}x - \frac{1}{4} \sin 2x$$

$$\frac{2A}{R^2} = \theta \Big|_0^\alpha - 2x + \sin 2x \Big|_0^{\frac{1}{2}\alpha}$$

$$= \theta - \theta + \sin \theta \Big|_0^\alpha$$

$$A = \frac{1}{2} R^2 \sin \alpha \quad (3)$$

Figure 1B:
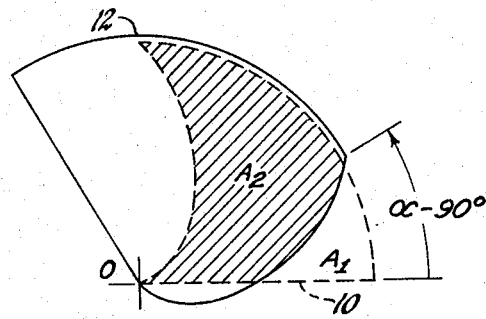

Consider next the area for values of $\alpha$ between ninety and one-hundred and eighty degrees. FIGURE 1b illustrates this region. Analagous to the prior calculation, the exposed area of the stator, $A_1$, is readily computed. The remaining area of overlap, $A_2$, is then $\frac{1}{2} R^2 - A_1$.

$$A_1 = \frac{1}{2} \int_0^{\alpha - 90} R^2 d\theta - \frac{1}{2} \int_0^{\alpha - 90} \left[\sqrt{2} R \sin \frac{1}{2}(\theta + 180 - \alpha)\right]^2 d\theta$$

let $$y = \frac{1}{2}(\theta + 180 - \alpha)$$

$$dy = \frac{1}{2} d\theta$$

$$\frac{2A}{R^2} = \int_0^{\alpha - 90} d\theta - 2 \int_{\frac{1}{2}(180 - \alpha)}^{\frac{1}{2}(90)} (\sin y)^2 \, 2dy$$

$$= \theta \Big|_0^{\alpha - 90} - 4\left(\frac{1}{2}y - \frac{1}{4} \sin 2y\right) \Big|_{\frac{1}{2}(180 - \alpha)}^{\frac{1}{2}(90)}$$

$$= \theta - \theta + 180 - \alpha + \sin(\theta + 180 - \alpha) \Big|_0^{\alpha - 90}$$

$$= \sin(\alpha - 90 + 180 - \alpha) - \sin(180 - \alpha)$$
$$= 1 - \sin \alpha$$

$$A_1 = \frac{1}{2} R^2 - \frac{1}{2} R^2 \sin \alpha$$

$$A_2 = \frac{1}{2} R^2 - A_1 = \frac{1}{2} R^2 - \frac{1}{2} R^2 + \frac{1}{2} R^2 \sin \alpha$$

$$A_2 = \frac{1}{2} R^2 \sin \alpha \quad (4)$$

Equations 3 and 4 demonstrate that the area and hence the capacity of a variable capacitor of this design is proportional to the sine of the shaft angle.

Figure 2:
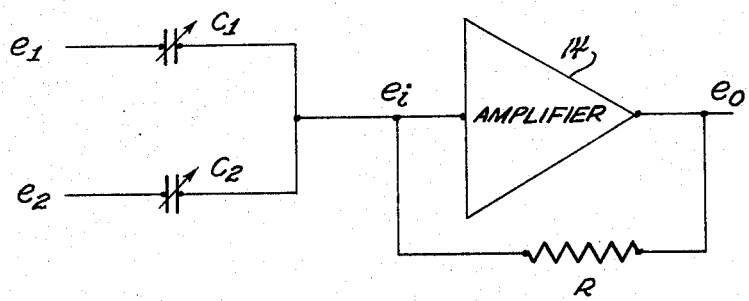
FIGURE 2 is a schematic circuit diagram indicating how capacitors formed in accordance with the plate configurations of FIGURES 1 and 1a may be used with a preamplifier to provide a voltage proportional to capacity.

Consider the circuit of FIGURE 2 in which two input voltages, $e_1$ and $e_2$, are connected by means of variable capacitors, $C_1$ and $C_2$, to the input of a high gain amplifier, 14, around which a feedback resistor, R, has been connected. Let $e_1$ be the alternating voltage $e \sin \omega t$ and $e_2$ be $$e \sin \left(\omega t - \frac{\pi}{2}\right)$$

the quadrature of $e$. Let the voltage at the input to the amplifier be $e_i$. The input impedance to the amplifier is very large so that essentially no current flows to the amplifier input. The voltage, $e_i$, then, is determined by the current, I, flowing through the resistor and the output voltage $e_0$, thus:

$$e_i = IR + e_0$$

$$I = j\omega C_1 (e_1 - e_i) + j\omega C_2 (e_2 - e_i)$$

then $$e_i = RC_1 j\omega (e_1 - e_i) + RC_2 j\omega (e_2 - e_i) + e_1$$

but $$e_0 = Ke_i; e_i = -\frac{1}{K} e_0$$

where $-K$ = the gain of the amplifier A
then $$-\frac{1}{K} e_0 = RC_1 j\omega \left(e_1 + \frac{1}{K} e_0\right) + RC_2 j\omega \left(e_2 + \frac{1}{K} e_0\right) + e_0$$

$$e_0 + Ke_0 = KRC_1 j\omega e_1 + RC_1 j\omega e_0 + KRC_2 j\omega e_2 + RC_2 j\omega e_0$$

By making K very large:

$$Ke_0 \approx KRC_1 j\omega e_1 + KRC_2 j\omega e_2$$
$$e_0 \approx RC_1 j\omega e_1 + RC_2 j\omega e_2$$

Consider now that the capacitors $C_1$ and $C_2$ are of the design discussed in connection with FIGURE 1 and that they are arranged to be operated by the same shaft and located 90° apart.
Then:

$$e_0 \approx G \sin a e_1 + G \sin\left(a - \frac{\pi}{2}\right) e_2$$

where $G = Rj\omega$ $$e_0 = Ge \sin a \sin \omega t + Ge \sin\left(a - \frac{\pi}{2}\right) \sin\left(\omega t - \frac{\pi}{2}\right)$$

$$e_0 = Ge(\sin a \sin \omega t + \cos a \cos \omega t)$$

By analogy with Equations 1 and 2 this is equivalent to:

$$e_0 = Ge \cos(\omega t + a) \quad (5)$$

Equation 5 shows that the capacitive resolver when operated in connection with an amplifier as just described performs a function which is equivalent to that performed by an electromechanical resolver. These principles are further elaborated upon in the following material with respect to the descriptions of a single speed and a two-speed capacitive resolver.

Figure 3:
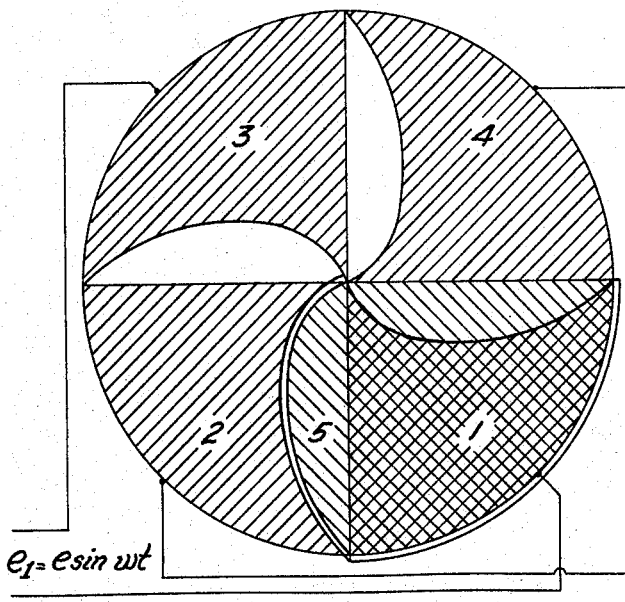
FIGURE 3 is a plan view of the rotor and stator plate configurations of a single speed capacitive resolver in accordance with a specific embodiment of the invention.
Figure 4:
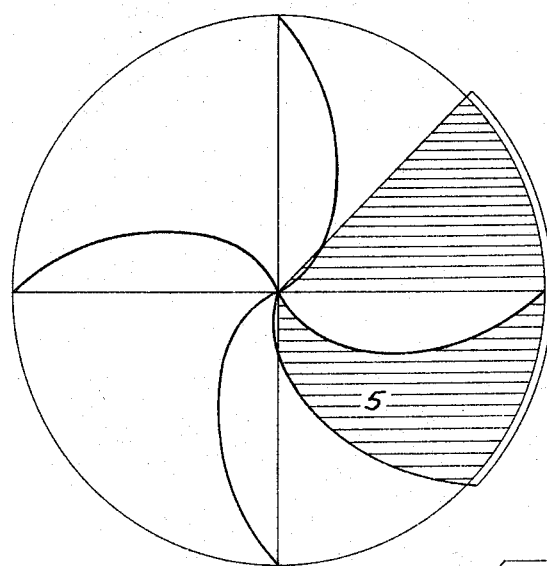
FIGURE 4 is a duplication of FIGURE 3 with the rotor plate angularly displaced to an arbitrary position.

FIGURES 3 and 4 illustrate a single speed capacitive resolver having stator plates, 1–4, each of which is electrically insulated from the others, and a rotor plate 5 which is axially spaced from the stator plates to be capacitively associatey therewith. In FIGURE 3, the rotor is shown in the reference position. It is seen that each of the stator plates is of exactly the same design as studied earlier in connection with FIGURE 1.

Stator plates 1 and 3 are connected in opposite polarity to the reference voltage, as shown. When the rotor 5 passes over stator 1, a voltage in phase with the reference voltage is impressed on the rotor. When the rotor passes over stator 3, a voltage 180° out of phase with this same reference voltage is impressed. This corresponds to the 180° phase shift obtained in a standard resolver when the armature is rotated 180°. The quadrature of the reference voltage is applied to plates 2 and 4 in a like manner, as shown in the figures. A single rotor plate 5 of the design already described is connected to the amplifier input thus forming the connected sides of $C_1$ and $C_2$ as described in connection with FIGURE 2.

FIGURE 4 illustrates this same single speed capacitive resolver with the shaft turned through an angle of about 45°. As shown, the areas of plates 1 and 4 marked by horizontal lines are capacitively associated with rotor plate 5.

Figure 5A:
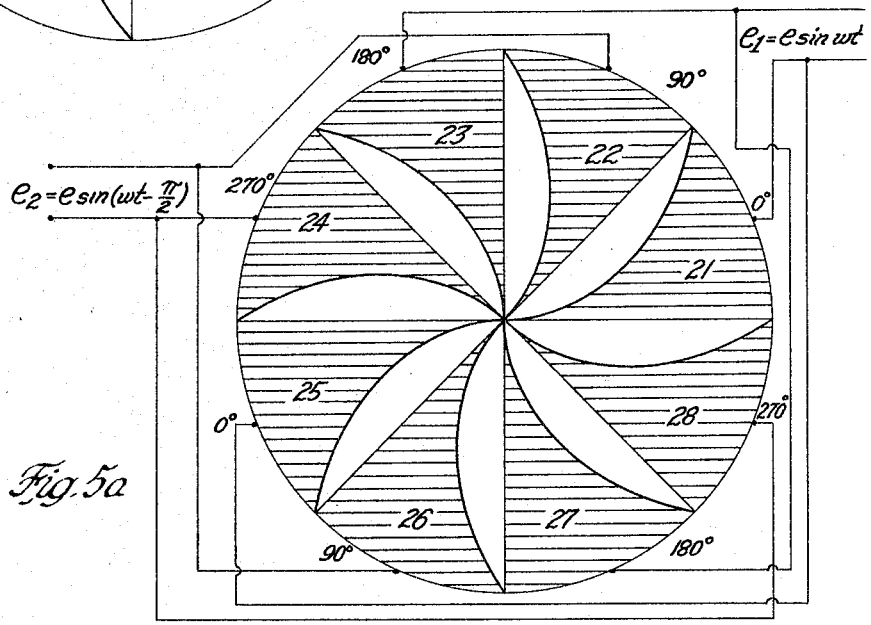
FIGURE 5a is a plan view of a two-speed capacitive resolver in accordance with a specific embodiment of the present invention.
Figure 5B:
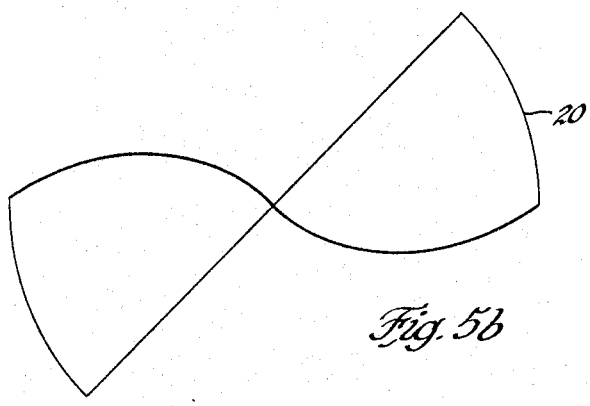
FIGURE 5b is a view of the two-speed capactive resolver rotor.

FIGURE 5a shows the stator configuration of a two speed capacitive resolver and FIGURE 5b, the rotor 20 to be used with this stator. The two speed stator has eight insulated plates 21–28 disposed in circular symmetry about a central axis. Here the odd number stators are connected to the reference voltage in phase and out of phase by 180° alternately. The even numbered segments are connected similarly to the quadrature of this reference voltage. The equation of the concave edge of these stator segments is:

$$r = \sqrt{2}R \sin \theta$$

Multispeed capacitive resolvers are made by applying the general formula for the concave edge of the stator segments of:

$$r = \sqrt{2}R \sin n\frac{\theta}{2}$$

where $n$ = the "speed" of the capacitive resolver.

The value of $n$ can be made arbitrarily large. Reduction to practice may be accomplished by drawing the design for the rotor and stator parts to a very large scale and then photographically reducing the design. The reduced photograph is then used to print an image on a metallic film laminated to a plastic sheet. By etching the resulting print, the multipolar stators and rotors can be made to great precision.

While the invention has been specifically described with reference to embodiments thereof, it is to be understood that much embodiments are not to be construed as limiting the invention but are merely illustrative. For a definition of the invention, reference should be had to the following claims.

What is claimed is:

1. A capacitive resolver for producing electrical signals related in phase to the angular disposition of two relatively rotatable members comprising a rotor member and a stator member, one of the members including four identical flat conductive plates which are symmetrically disposed about an axis in coplanar fashion, each of said plates being bounded by a straight edge of length R extending radially from said axis, an arcuate peripheral edge of radius R, and a concavely curved edge described by the equation $$r = \sqrt{2}R \sin \frac{\theta_1}{2}$$

wherein $r$ is the radial distance from the center of the arcuate edge and $\theta_1$ is the angle measured from said straight edge, a first time varying voltage impressed across one diagonally opposite pair of plates, and a second time varying voltage in quadrature with the first voltage impressed across the other diagonally opposite pair of plates, the other of the members including a single conductive plate extending raidally from said axis and rotatable thereabout, said single plate being mounted by a straight radially extending edge of length R, an arcuate peripheral edge of radius R, and a convexly curved edge described by the equation $$r = \sqrt{2}R \sin \frac{\theta_2}{2}$$

wherein $r$ is the radial distance from the center of the last mentioned arcuate edge and $\theta_2$ is the angle measured from the last mentioned straight edge, said single plate being axially spaced from the plates of said one member and capacitively associated therewith whereby a voltage is induced on the single plate having a phase angle with respect to one of the time varying voltages related to the angle of displacement of said single plate with respect to said four plates.

2. A capacitive resolver as defined in claim 1 including a high negative gain amplifier having its input connected with said single capacitive element, and a feedback resistor connected between the output and input of the amplifier whereby the amplifier output voltage has a phase angle, with respect to the reference voltage, equal to the angle of displacement of the rotor from its reference position.

3. A multispeed capacitive resolver comprising stator and rotor members, one of the members including $4n$ identical capacitive elements insulated from each other and symmerically arranged about an axis in coplanar fashion with each element being contained within a sector of $360/4n$ degrees, each of said identical capacitive elements being a flat plate bounded by a straight edge of length R extending radially from said axis, an arcuate peripheral edge of radius R, and a concavely curved edge described by the equation $$r = \sqrt{2}R \sin \frac{\theta_1}{2}$$

wherein $r$ is the radial distance from the center of the arcuate edge and $\theta_1$ is the angle measured from said straight edge, the other of the members including $n$ idential capacitive elements electrically connected together and coplanarly arranged about said axis in a circularly symmetrical pattern with each element being contained within a sector of 360/4n degrees where $n$ is any integer greater than unity, said single capacitive element being a flat plate bounded by a straight edge of length R extending radially from said axis, an arcuate peripheral edge of radius R, and a convexly curved edge described by the equation $$r = \sqrt{2} R \sin \frac{\theta_2}{2}$$

wherein $r$ is the radial distance from the center of the last mentioned arcuate edge and $\theta_2$ is the angle measured from the last mentioned straight edge, the elements of the stator and rotor members being axially spaced and capacitively associated, a source of reference alternating voltage connected across adjacent odd numbered capacitive elements of said one of the members, and a source of quadrature alternating voltage connected across adjacent even numbered elements of said one of the members whereby the voltage induced on the capacitive element of said other of the members has a phase angle with respect to the reference voltage of $n$ times the relative angle of displacement of the element from a reference position.

4. A multispeed capacitive resolver as defined in claim 3 including a high negative gain amplifier having its input connected with said single capacitive element, and a feedback resistor connected between the output and input of the amplifier whereby the amplifier output voltage has a phase angle, with respect to the reference voltage, equal to the angle of displacement of the rotor from its reference position.

References Cited by the Examiner

UNITED STATES PATENTS

| | | | |
|---|---|---|---|
| 2,004,613 | 6/1935 | Meacham | 317—254 |
| 2,330,822 | 10/1943 | Fischer | 178—44 |
| 2,480,187 | 8/1949 | Gamertsfelder | 321—51 |
| 2,527,215 | 10/1950 | Hahn | 178—44 |
| 2,802,178 | 8/1957 | Shafer et al. | 324—61 |
| 3,146,394 | 8/1964 | Frisch | 323—93 |

JOHN F. COUCH, *Primary Examiner.*

LLOYD McCOLLUM, MILTON O. HIRSHFIELD, *Examiners.*

A. D. PELLINEN, *Assistant Examiner.*

UNITED STATES PATENT OFFICE
CERTIFICATE OF CORRECTION

Patent No. 3,265,960            August 9, 1966

Benjamin P. Blasingame

It is hereby certified that error appears in the above numbered patent requiring correction and that the said Letters Patent should read as corrected below.

Column 4, line 26, for that portion of the equation reading $$\frac{2A}{R^2} \quad \text{read} \quad \frac{2A_1}{R^2}$$

line 64, for that portion of the equation on the right-hand side reading -- "$+e_1$" read -- $+e_o$ --; line 67, the equation should appear as shown below instead of as in the patent:

$$e_o = -Ke_i : e_i = -\frac{1}{K} e_o$$

lines 73 and 74, for that portion of the equation reading --

$$(e_2 + \frac{1}{Ke_o} + e_o \quad \text{read} \quad (e_2 + \frac{1}{K} e_o) + e_o$$

column 5, line 32, for "associatey" read -- associated --;
column 6, line 9, for "much" read -- such --.

Signed and sealed this 22nd day of August 1967.

(SEAL)
Attest:

ERNEST W. SWIDER            EDWARD J. BRENNER
Attesting Officer            Commissioner of Patents